United States Patent
Kim et al.

(10) Patent No.: US 10,174,249 B2
(45) Date of Patent: Jan. 8, 2019

(54) QUANTUM ROD COMPOSITION, QUANTUM ROD FILM AND DISPLAY DEVICE INCLUDING THE SAME

(71) Applicant: LG Display Co., Ltd., Seoul (KR)

(72) Inventors: Kyu-Nam Kim, Paju-si (KR); Jin-Wuk Kim, Goyang-si (KR); Byung-Geol Kim, Paju-si (KR); Kyung-Kook Jang, Paju-si (KR); Hee-Yeol Kim, Incheon (KR); Sung-Il Woo, Daejeon (KR); Tae-Yang Lee, Gwangju (KR)

(73) Assignee: LG Display Co., Ltd., Seoul (KR)

( * ) Notice: Subject to any disclaimer, the term of this patent is extended or adjusted under 35 U.S.C. 154(b) by 372 days.

(21) Appl. No.: 14/935,294

(22) Filed: Nov. 6, 2015

(65) Prior Publication Data

US 2016/0137920 A1    May 19, 2016

(30) Foreign Application Priority Data

Nov. 13, 2014  (KR) ........................ 10-2014-0158166

(51) Int. Cl.
   *C09K 11/88* (2006.01)
   *C09K 11/56* (2006.01)
   (Continued)

(52) U.S. Cl.
   CPC .............. *C09K 11/883* (2013.01); *B05D 3/14* (2013.01); *C09K 11/02* (2013.01); *C09K 11/54* (2013.01);
   (Continued)

(58) Field of Classification Search
   CPC ........ C09K 11/883; C09K 11/02; C09K 11/54; C09K 11/562; C09K 11/881;
   (Continued)

(56) References Cited

U.S. PATENT DOCUMENTS

2014/0009902 A1* 1/2014 Banin ............... G02F 1/133617
                                                      362/19
2014/0016296 A1   1/2014 Jeon et al.

FOREIGN PATENT DOCUMENTS

EP          2 680 069 A1   1/2014
KR    10-2013-0054884 A    5/2013
                  (Continued)

OTHER PUBLICATIONS

Mukhina, M.V. et al., "Electrically controlled polarized photoluminescence of CdSe/ZnS nanorods embedded in a liquid crystal template," *Nanotechnology*, 2012, vol. 23, six pages.
(Continued)

*Primary Examiner* — Ruiyun Zhang
(74) *Attorney, Agent, or Firm* — Fenwick & West LLP

(57) ABSTRACT

Embodiments relate to a quantum rod composition, a quantum rod film, a display device with a quantum rod film, and a method of forming a quantum rod film. The quantum rod film includes a plurality of quantum rods and a polymer with a dipole side chain. Responsive to an external electric field, the major axis of the quantum rods and an axis of the dipole side chain arranges in the same direction. The display device includes a plurality of pixel and common electrodes for generating an electric field, and a backlight unit positioned under a first substrate. Responsive to receiving light from the backlight unit, the quantum rod film emits light polarized in a direction parallel to the major axis of the quantum rods.

9 Claims, 9 Drawing Sheets

(51) Int. Cl.
*C09K 11/89* (2006.01)
*G02F 2/02* (2006.01)
*B05D 3/14* (2006.01)
*C09K 11/02* (2006.01)
*C09K 11/54* (2006.01)
*G02F 1/01* (2006.01)
*G02F 1/17* (2006.01)
*G02F 1/03* (2006.01)
*C09K 19/24* (2006.01)
*C09K 19/38* (2006.01)
*C09K 19/12* (2006.01)
*C09K 19/20* (2006.01)

(52) U.S. Cl.
CPC .......... *C09K 11/562* (2013.01); *C09K 11/565* (2013.01); *C09K 11/881* (2013.01); *C09K 11/89* (2013.01); *C09K 19/24* (2013.01); *C09K 19/3852* (2013.01); *G02F 1/0136* (2013.01); *G02F 1/0316* (2013.01); *G02F 1/172* (2013.01); *G02F 2/02* (2013.01); *C09K 2019/122* (2013.01); *C09K 2019/123* (2013.01); *C09K 2019/2035* (2013.01); *C09K 2219/03* (2013.01); *G02F 2201/086* (2013.01); *G02F 2201/124* (2013.01); *G02F 2202/01* (2013.01); *G02F 2202/023* (2013.01); *G02F 2202/046* (2013.01); *G02F 2202/106* (2013.01); *G02F 2202/108* (2013.01); *G02F 2202/36* (2013.01); *G02F 2203/34* (2013.01)

(58) Field of Classification Search
CPC ..... C09K 19/3852; B05D 3/14; G02F 1/0136; G02F 1/172; G02F 1/02; G02F 2202/01; G02F 2202/023; G02F 2202/046; G02F 2202/36

USPC ................. 428/1.1, 1.3, 1.31, 105; 349/96; 977/773; 362/19
See application file for complete search history.

(56) References Cited

FOREIGN PATENT DOCUMENTS

| | | |
|---|---|---|
| KR | 10-2013-0105344 A | 9/2013 |
| KR | 10-2013-0140689 A | 12/2013 |
| KR | 10-2014-0000735 A | 1/2014 |
| WO | WO 2010-089743 A1 | 8/2010 |
| WO | WO 2012-035535 A1 | 3/2012 |
| WO | WO 2013-167152 A1 | 11/2013 |

OTHER PUBLICATIONS

Bashouti, M. et al., "Alignment of Colloidal CdS Nanowires Embedded in Polymer Nanofibers by Electrospinning," ChemPhys Chem, 2006, pp. 102-106, vol. 7.
European Extended Search Report, European Application No. 15194487.3, dated Mar. 29, 2016, 12 pages.
Peng, X. et al., "Shape Control of CdSe Nanocrystals," Nature, Mar. 2, 2000, pp. 59-61, vol. 404.
Huynh, W.U. et al., "Hybrid Nanorod-Polymer Solar Cells," Science, Mar. 29, 2002, pp. 2425-2427, vol. 295, Issue 5564.
Korean Office Action, Korean Application No. 10-2014-0158166, dated Mar. 10, 2016, 5 pages (with concise explanation of relevance).

* cited by examiner

QUANTUM ROD COMPOSITION, QUANTUM ROD FILM AND DISPLAY DEVICE INCLUDING THE SAME

CROSS-REFERENCE TO RELATED APPLICATION

This application claims priority to and the benefit of Republic of Korea Patent Application No. 10-2014-0158166 filed in Republic of Korea on Nov. 13, 2014, which is hereby incorporated by reference.

BACKGROUND OF THE INVENTION

Field of the Invention

Embodiments of the invention relate to a quantum rod, and more particularly, to a quantum rod film having a low driving voltage and an improved polarization property, and a quantum rod composition and a display device including the same.

Discussion of the Related Art

Recently, as the society has entered in earnest upon an information age, a field of display devices that represent all sorts of electrical signals as visual images has developed rapidly. Flat panel display device, such as a liquid crystal display (LCD) device, a plasma display panel (PDP) device, a field emission display (FED) device, and an organic light emitting diode (OLED) device, has been introduced.

On the other hand, use of a quantum rod (QR) to the display device has been researched or studied. Since the QR has high emitting efficiency and excellent reproducibility, the QR can be applied to various uses. For example, applications of the QR to an emitting diode for lightings and a light source or other elements for the LCD device have been researched.

The QR includes a nano-sized core particle of II-VI, III-V, I-III-VI, or IV-VI semiconductor particle and a shell covering the core particle.

Since extinction coefficient and quantum yield of the QR is very large in comparison to general dyes, the QR emits strong fluorescent light. In addition, by controlling a diameter of the QR, a wavelength of light emitted from the QR can be controlled.

The QR emits linearly-polarized light. Namely, the light from the QR has a linearly-polarized property along a length direction of the QR.

In addition, the QR has an optical property that is capable of controlling emission by an electric field applied from the outside. This may be referred to as stark effect.

On the other hand, to simplify a fabricating process of the display device including the QR, a solution process for the QR film is introduced. Namely, by fabricating the QR film by the solution process, e.g., an ink jet method, a dispensing method, a roll-to-roll method, or a spin-coating method, the fabricating process of the display device including the QR is simplified and a thickness uniformity of the QR film is improved.

For example, the ink jet process is adequate to form a fine pattern and can use a low viscosity solution, and a material loss is minimized.

To coat the QRs by the ink jet method, an ink formulation of the QRs is required. Namely, the QR ink should have viscosity of about 8 to about 30 cP and surface tension of about 20 to about 40 dyne/cm and low volatility, e.g., a boiling point above 280° C., for the ink jet process.

However, the polarization property is decreased in the QR film formed by the solution process. In addition, there is a problem of high driving voltage in the QR film formed by the solution process.

SUMMARY OF THE INVENTION

Accordingly, embodiments of the invention are directed to a QR composition, a QR film, and a display device including the same that substantially obviate one or more of the problems due to limitations and disadvantages of the related art, and have other advantages.

An objective of the invention is to provide a QR film having advantages in driving voltage and polarization property.

Another objective of the invention is to provide a QR solution for fabricating a QR film.

Another objective of the invention is to provide a display device having advantages in the production costs.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

Embodiments relate to a quantum rod (QR) composition including a plurality of quantum rods, a polymer including a main chain and a plurality of dipole side chains attached to the main chain, and a solvent.

Embodiments also relate to a quantum rod film including a plurality of quantum rods, and a polymer including a main chain and a plurality of dipole side chains attached to the main chain, in which the a major axis of the plurality of quantum rods and an axis of the plurality of dipole side chains are arranged along the same direction.

Embodiments also relate to a display device including a first substrate, a second substrate facing the first substrate, a plurality of pixel electrodes and a plurality of common electrodes on the first substrate, a quantum rod film positioned between the first substrate and the second substrate. The quantum rod film includes a plurality of quantum rods, and a polymer including a main chain and a plurality of dipole side chains attached to the main chain, in which a major axis of the plurality of quantum rods and an axis of the plurality of dipole side chains are arranged along a first direction. The display device further includes a backlight unit under the first substrate, in which responsive to receiving light from the backlight unit, the quantum rod film emits light polarized along the first direction.

Embodiments also relate to a method of forming a quantum rod film. A plurality of pixel electrodes and a plurality of common electrodes are formed on a substrate. A quantum rod composition is coated on the substrate. The quantum rod composition includes a plurality of quantum rods, a polymer including a main chain and a plurality of dipole side chains attached to the main chain, and a solvent. An electric field between the plurality of pixel electrodes and the plurality of common electrodes is generated, and the quantum rod composition is cured to form a quantum rod film on the substrate, in which a major axis of the plurality of quantum rods and an axis of the plurality of dipole side chains are arranged along a direction substantially parallel to the electric field.

It is to be understood that both the foregoing general description and the following detailed description are examples and are explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE EMBODIMENTS

Reference will now be made in detail to embodiments of the invention, examples of which are illustrated in the accompanying drawings.

The On/Off control and the polarization property of a QR are determined by an arrangement degree of the QRs.

Namely, the holes and the electrons in the QR is separated by an electric field such that the Off state is provided. In this instance, when the QRs are arranged along the same direction, the driving voltage for the QRs is reduced. In addition, when the QRs are arranged along the same direction, the linearly-polarization property of the light emitted from the QRs is improved.

However, in the QR film fabricated by the solution process, the polymer used for the solution process of the QRs is randomly arranged such that the arrangement degree of the QRs is decreased. Accordingly, in the QR film fabricated by the solution process, the polarization property is decreased and the driving voltage is increased. In addition, the driving voltage is further increased by a shielding effect of the electric field by the polymer.

Figure 1:
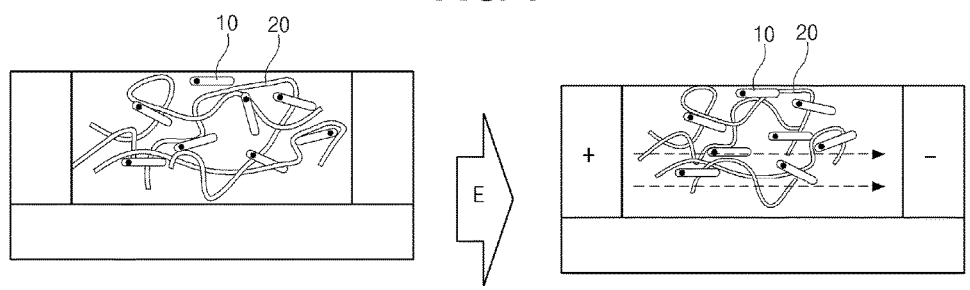
FIG. 1 illustrates a driving principle of a QR film.

Namely, referring to FIG. 1 illustrating a driving principle of a QR film, even when the voltage is applied to the QR film to generate an electric field "E", the QR 10 is trapped by the polymer 20 such that the arrangement degree of the QR 10 is reduced.

In the present invention, a QR composition, a QR film, and a display device including the QR film being capable of increasing the arrangement degrees of the QRs and being adequate for fabrication in a solution process is disclosed.

First Embodiment

A QR composition of the present invention includes a QR, a polymer having a dipole side chain, and a solvent.

In the QR composition, the QR has approximately 1 to about 5 weight (wt) %, and the polymer has approximately 10 to 20 wt %. The QR composition includes the solvent in a residual amount. Accordingly, the QR composition has properties, i.e., viscosity, surface tension, volatility, being adequate to the solution process.

Figure 2:
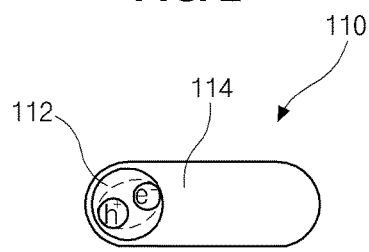
FIG. 2 is a schematic view of a QR for a QR composition according to a first embodiment of the present invention.

Referring to FIG. 2, which is a schematic view of a QR for a QR composition according to a first embodiment of the present invention, the QR 110 for the QR composition of the present invention may include a core 112 and a shell 114 surrounding the core 112.

The core 112 may have a sphere shape, an elliptical sphere shape, a polyhedral shape, or a rod shape. The shell 114, which surrounds the core 112, may have a rod shape having major and minor axes. The major axis of the QR 110 may refer to an axis along a longer length of the shell 114 or core 112 of the QR 110. The minor axis of the QR 110 may refer to an axis perpendicular to the major axis of the QR 110. Accordingly, in a cross-sectional view along the minor axis of the QR 110, the QR 110 may have a circular shape, an elliptical shape or a polygonal shape. In FIG. 2, the QR 110 has the circular shape in the cross-sectional view along the minor axis.

Alternatively, the QR 110 may have the core 112 without the shell 114. In this instance, the core 112 may have an elliptical shape or a rod shape.

In addition, the shell 114 may have a single-layered structure or a multi-layered structure and may be formed of one or more of alloys, an oxide compound and a doped material. The shell 114 may have a ratio of the minor axis to the major axis with a range of 1:1.1 to 1:30.

The core 112 of the QR 110 is formed of the II-VI, III-V, I-III-VI, or IV-VI semiconductor material. For example, when the core 112 is formed of the II-VI semiconductor material, the core 112 may be formed from one or more of CdSe, CdS, CdTe, ZnO, ZnSe, ZnS, ZnTe, HgSe, HgTe, and CdZnSe.

To emit red light, the QR 110 may have the core 112 of CdSe and the shell 114 of CdS, or may have the core 112 of CdSeS and the shell 114 of CdS. The QR 110 may include the core 112 of CdZnS without the shell to emit blue light.

Figure 3A:
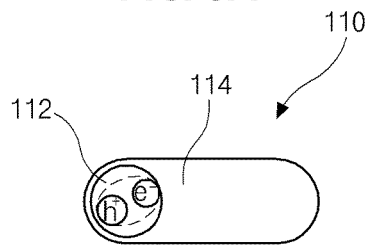
FIGS. 3A and 3B are views illustrating a driving principle of a QR.
Figure 3B:
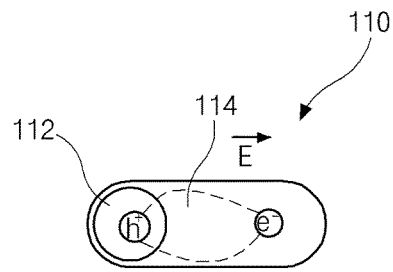

Referring to FIGS. 3A and 3B, which are views illustrating a driving principle of a QR, without the electric field to the QR 110, including the core 112 and the shell 114, the hole "h+" and the electron "e−" are combined in the core 112. (FIG. 3A) On the other hand, when the electric field "E" along the major axis is applied to the QR 110, the hole "h+" and the electron "e−" are spatially separated such that the emission of the QR 110 is controlled. (FIG. 3B)

Figure 4:
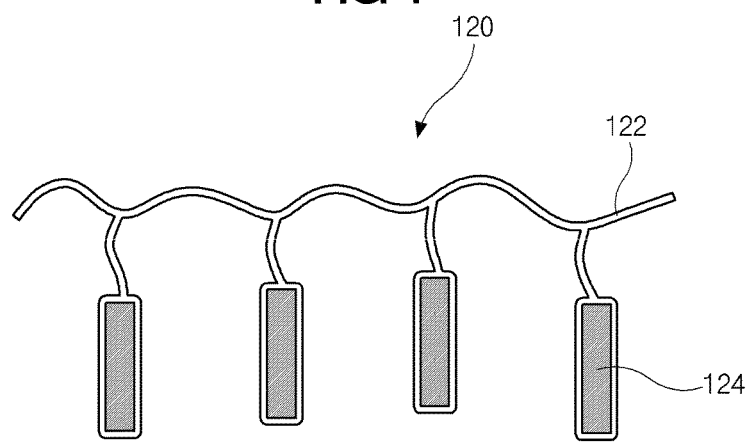
FIG. 4 is a schematic view of a polymer for a QR composition according to the first embodiment of the present invention.

Referring to FIG. 4, which is a schematic view of a polymer for a QR composition according to the first embodiment of the present invention, the polymer 120 for the QR composition of the present invention has a dipole side chain 124 linked or combined to a main chain 122. For example, the polymer 120 may be polyoxetane, polysiloxane, or polyester, each of which has the dipole side chain 124. Namely, the main chain 122 of the polymer 120 may be selected from polyoxetane, polysiloxane, and polyester.

The dipole side chain 124 is a compound that includes one or more selected from materials in Formulas 1-1 to 1-4. In Formulas 1-1 to 1-4, R is selected from F, CF$_3$, and CN. The dipole side chain 124 may have an axis along a length of the compound. For example, in Formulas 1-1 through 1-4, the axis of the dipole side chain 124 may be substantially parallel to a direction from the R group to the oxygen (O) bond of the compound.

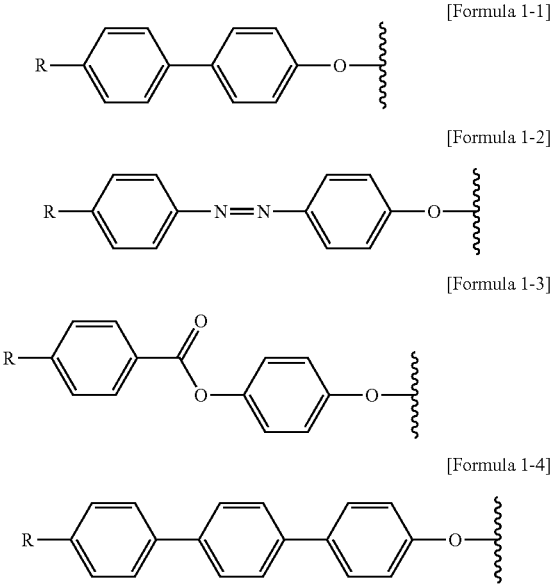

[Formula 1-1]

[Formula 1-2]

[Formula 1-3]

[Formula 1-4]

The polymer 120 is synthesized by the following.

1. Synthesis of Monomer

[Reaction Formula 1]

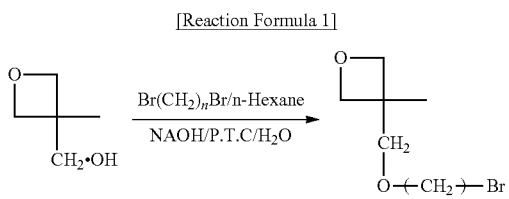

NaOH solution (1M, 200 ml) was put into a three-neck round flask (500 ml), and 3-methyl-3-oxetanemethanol (2 g, 19.3 mmol) and tetrabutylamonium chloride (0.05 g) were put into the flask.

After stirring for about 10 minutes, hexane (100 ml) and dibromodecane (12 g, 60.5 mmol) were added, and the mixture was stirred and reacted under room temperature for approximately 8 hours. The mixture was refluxed under a temperature of 60° C. for about 3 hours. The reaction tube was cooled in room temperature, and a hexane layer was separated. Water was removed by MgSO$_4$, and the solvent was distilled under a reduced pressure. The resultants of brown color was separated by column chromatography using a developing solvent (ethylacetate:hexane=1:15) and silica. (yield: 78%)

[Reaction Formula 2]

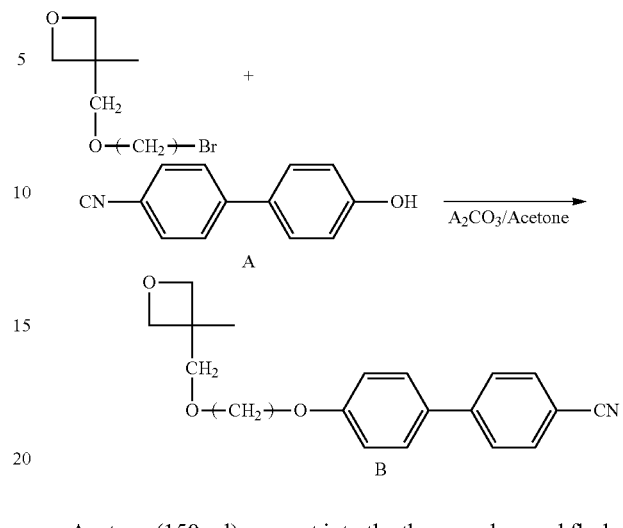

Acetone (150 ml) was put into the three-neck round flask, and potassium carbonate (6.15 g, 153.6 mmol), tetra-butyl ammonium bromide (1.5 g, 5.1 mmol), 3-[(10-bromo-hexoxy)methyl]-3-methyloxetane (21.4 g, 66.7 mmol), and compound A (10 g, 51.2 mmol) were put into the flask. The mixture were refluxed for 24 hours under a temperature of 60~70° C. to react. After completion of the reaction, the resultant was cooled in room temperature. The floating matters were removed by the filter paper, and the solvent were removed under the reduced pressure. The yellow mixture, which was obtained by distillation, was separated by a column-chromatography using a developing solvent of ethylacetate and hexane (1:4) such that compound B was obtained. (yield: 75%)

2. Synthesis of Polymer

[Reaction Formula 3]

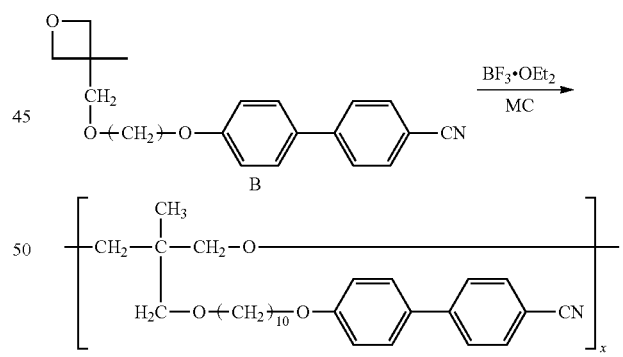

Boron trifluoride etherate (0.016 g, 0.14 mmol) was diluted by dichloromethane (1 ml), and the diluted boron trifluoride etherate was slowly dropped into a solution, where compound B (3 g, 6.88 mmol) was dissolved in anhydride dichloromethane (15 ml) for 1 hour under a condition of argon and a temperature of −10° C. The mixture was reacted for 24 hours under room temperature. After completion of the reaction, the solvent was removed by distillation under reduced pressure and a temperature of 60° C., and the resultant was dissolved in dichloromethane and put into the dialysis tube. The dialysis tube was dipped into methanol (250 ml) of high-performance liquid chromatography (HPLC) grade. The matter in the dialysis tube was slowly stirred using the stirrer, and it is verified that monomers were extracted into the solution by the UV lamp. The monomers were removed using refreshed clean solvent once every two hours (for a total of six times) such that polymer in Formula 2-1 was obtained.

By changing the compound A into compound A', which has different R, polymers in Formulas 2-2 and 2-3 can also be obtained. Similarly, polymers with different dipole side chain structures may also be obtained by changing the compound A into any one of the compounds in Formulas 1-2 through 1-4.

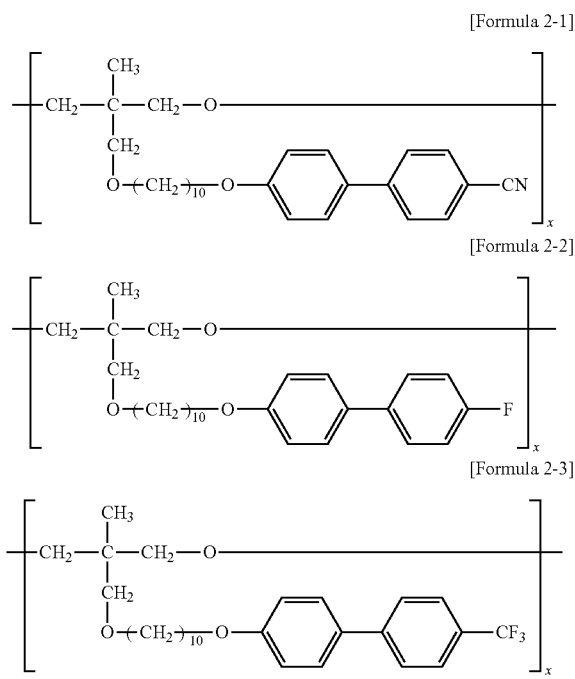

[Formula 2-1]

[Formula 2-2]

[Formula 2-3]

The viscosity of the QR composition is controlled by the main chain 122 of the polymer 120, and the arrangement degree of the QR 110 is improved due to the dipole side chain 124 of the polymer 120.

Namely, since the dipole side chain 124 of the polymer 120 has a dipole property, the axis of the dipole side chain 124 is arranged along a direction of the electric field due to the dipole property with the electric field. Accordingly, the arrangement degree of the QR 110 is improved.

Figure 5:
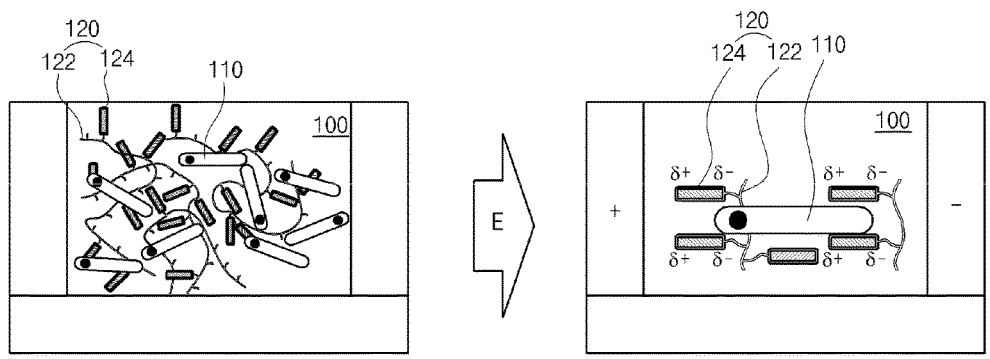
FIG. 5 is a schematic view illustrating a change with the On/Off states in the QR composition according to the first embodiment of the present invention.

Referring to FIG. 5, which is a schematic view illustrating a change with the On/Off states in the QR composition according to the first embodiment of the present invention, without the electric field, the QR 110 and the polymer 120 in the QR composition 100, which includes the QR 110, the polymer 120 including the main chain 122 and the dipole side chain 124, and the solvent (not shown), are randomly arranged.

However, when the electric field "E" is generated in the QR composition 100, the dipole is induced in the dipole side chain 124 of the polymer 120 such that the axis of the dipole side chain 124 is arranged along the direction of the electric field "E". As a result, the arrangement degree of the QR 110 is improved.

Namely, in the related art QR composition, the arrangement degree of the QR is reduced by the randomly-arranged polymer. However, in the present invention, since the polymer 120 has the dipole side chain 124 being capable of generating an induced dipole, the arrangement degree of the QR 110 with the electric field is improved.

Accordingly, in the QR film fabricated by the above QR composition, the polarization property is improved, and the driving voltage is reduced.

Second Embodiment

Figure 6A:
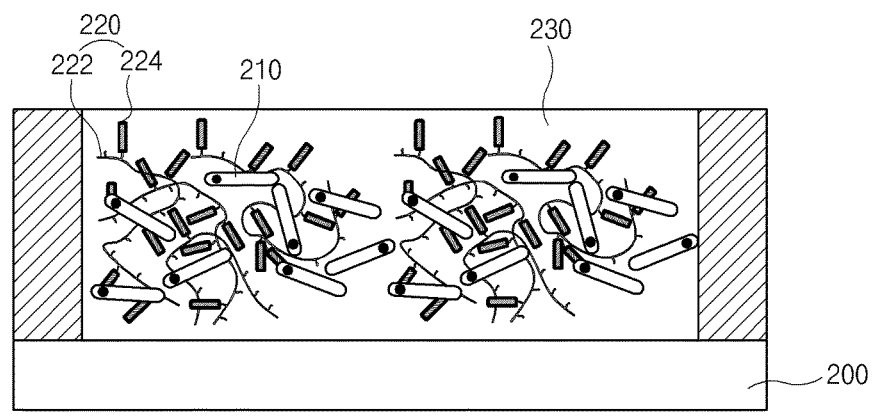
FIGS. 6A to 6C are schematic cross-sectional views illustrating a fabricating process of a QR film according to a second embodiment of the present invention.
Figure 6B:
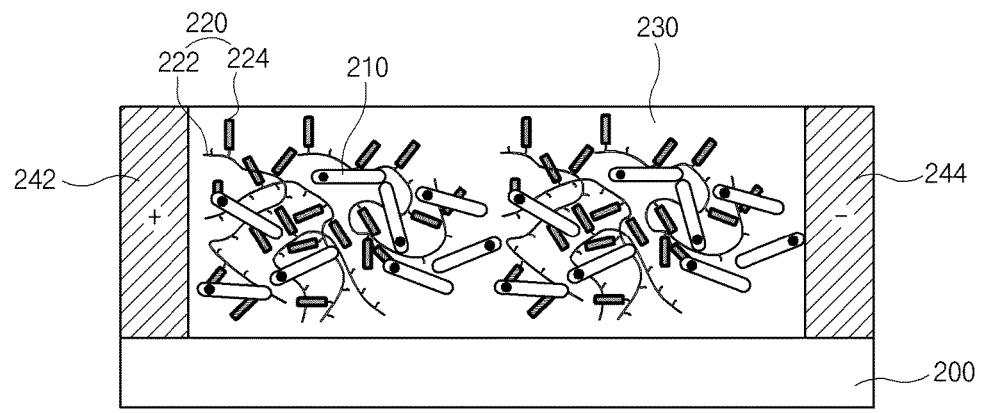
Figure 6C:
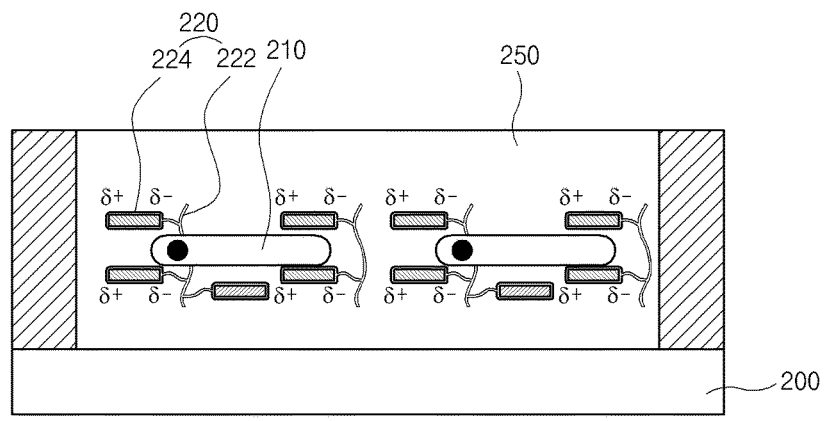

FIGS. 6A to 6C are schematic cross-sectional views illustrating a fabricating process of a QR film according to a second embodiment of the present invention.

As shown in FIG. 6A, the QR composition 100 (of FIG. 5) is coated to form a QR solution layer 230 on a base substrate 200.

Namely, the QR composition 100 including the QR 210, the polymer 220, which includes the main chain 222 and the dipole side chain 224, and the solvent (not shown) is coated on the base substrate 200 to form the QR solution layer 230. For example, the QR composition 100 may be coated by an ink jet method.

Next, as shown in FIG. 6B, an electric field "E" (FIG. 5) along a first direction is generated in the QR solution layer 230, and the QR solution layer 230 is cured.

For example, first and second electrodes 242 and 244 are positioned at opposite sides of the QR solution layer 230, and voltages are applied to the first and second electrodes 242 and 244 to form the electric field "E". The QR solution layer 230 may be cured by heat generated by applying the voltages. Alternatively, a heating process may be performed to the QR solution layer after the electric field is generated or may be simultaneously performed with the electric field generation process.

By the electric field "E", as shown in FIG. 6C, the QRs 210 are arranged along the first direction such that a QR film 250 is formed. The solvent is evaporated by the curing process, which is simultaneously or separately performed with the electric field generation process, such that the QR film 250 may include the QR 210 and the polymer 220 without the solvent. Alternatively, the QR film 250 may further include the cured solvent material. For example, the solvent may be one or more of tetralin and diethylbenzene.

As mentioned above, in the QR composition, the viscosity of the QR composition is controlled by the main chain 222 of the polymer 220 such that the QR film 250 can be formed by a solution process. In addition, the induced dipole is generated by the dipole side chain 224 of the polymer 220 with the electric field "E" such that the arrangement degree of the QRs 210 is improved.

Accordingly, in the QR film 250 of the present invention, the polarization property of the light emitted from QR film 250 is improved, and the driving voltage of the QR film 250 is reduced.

Third Embodiment

Figure 7:
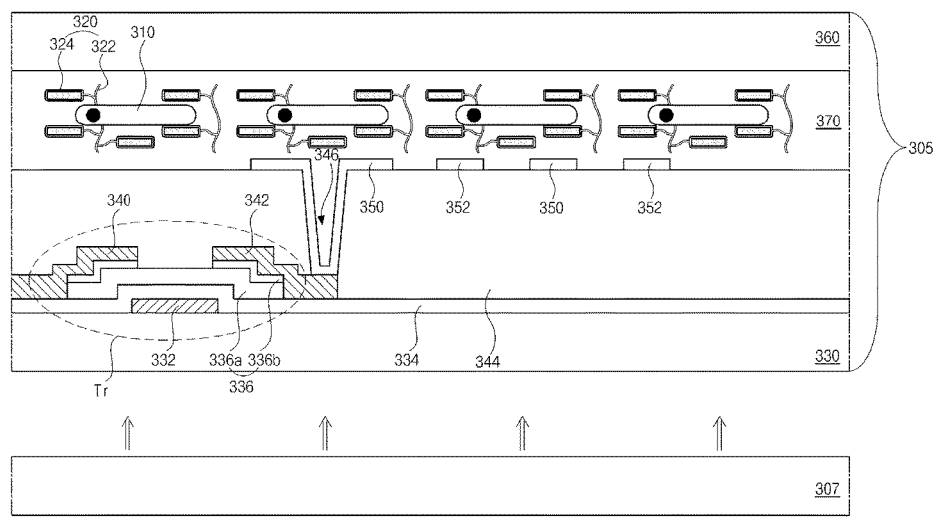
FIG. 7 is a schematic cross-sectional view of a display device including a QR film according to a third embodiment of the present invention.

FIG. 7 is a schematic cross-sectional view of a display device including a QR layer according to a third embodiment of the present invention.

As shown in FIG. 7, a QR display device 300 of the present invention includes a display panel 305, which includes pixels and common electrodes 350 and 352 for generating an electric field and a QR film 370, and a backlight unit 307 including a UV light source (not shown).

The display panel 305 includes a first substrate 330, which is adjacent to the backlight unit 307, the pixel and common electrodes 350 and 352, which is positioned over the first substrate 330, a second substrate 360, which faces the first substrate 330, and the QR film 370 positioned between the first and second substrates 330 and 360. The QR film 370 includes the QR 310 and the polymer 320.

The pixel electrode 350 and the common electrode 352 are positioned between the first substrate 330 and the QR film 370 and generate a horizontal electric field for driving the QR 310 of the QR film 370.

Each of the pixel and common electrodes 350 and 352 may have a bar shape. For example, each of the pixel and common electrodes 350 and 352 may have a bar shape extending across the first substrate 330.

Alternatively, one of the pixel and common electrodes 350 and 352 may have a plate shape, and the other one of the pixel and common electrodes 350 and 352 may include at least one opening. In this instance, the pixel and common electrodes 350 and 352 are positioned in different layers and overlap each other in a pixel region. Namely, the display panel 305 may have a fringe field switching (FFS) mode electrode structure.

A thin film transistor (TFT) Tr as a switching element is formed on the first substrate 330, and the pixel electrode 350 may be connected to the TFT Tr.

For example, the TFT Tr may include a gate electrode 332 on the first substrate 330, a gate insulating layer 334 on the gate electrode 332, a semiconductor layer 336, which is disposed on the gate insulating layer 334 and overlaps the gate electrode 332, a source electrode 340 on the semiconductor layer 336, and a drain electrode 342 on the semiconductor layer 336, and spaced apart from the source electrode 340.

The semiconductor layer 336 may include an active layer 336a of intrinsic amorphous silicon and an ohmic contact layer 336b of impurity-doped amorphous silicon. Alternatively, the semiconductor layer 336 may have a single-layered structure of an oxide semiconductor material.

Although not shown, a gate line along one direction is formed on the first substrate 330, and a data line, which crosses the gate line to a pixel region, is formed on the gate insulating layer 334. In addition, a common line, which is parallel to and spaced apart from the gate line, is formed on the first substrate 330.

A passivation layer 344, which includes a drain contact hole 346 exposing the drain electrode 342, is formed to cover the TFT Tr.

The pixel electrode 350 is formed on the passivation layer 344 and connected to the drain electrode 342 through the drain contact hole 346. The pixel electrode 350 may have a bar shape.

The common electrode 352 is formed on the passivation layer 344 and may have a bar shape. The common electrode 352 may be connected to the common line (not shown) through a common contact hole (not shown). The common contact hole is formed through the passivation layer 344 and the gate insulating layer 334 and exposes the common line.

The common electrode 352 and the pixel electrode 350 are alternately arranged with each other such that an electric field, which is substantially parallel to a surface of the first substrate 330, is generated between the pixel and common electrodes 350 and 352. Each common electrode 352 may be positioned in between two pixel electrodes 350, so that a horizontal electric field is generated between each pair of adjacent pixel and common electrodes 350 and 352. Namely, a horizontal electric field is generated between the pixel and common electrodes 350 and 352. In one embodiment, the pixel and common electrodes 350 and 352 may be formed on the same layer.

The QR film 370 is positioned between the first and second substrates 330 and 360 and includes the QR 310 and the polymer 320. The polymer 320 includes the main chain 322 and the dipole side chain 324. The QR 310 and the dipole side chain 324 may be arranged in a direction being substantially parallel to the horizontal electric field between the pixel and common electrodes 350 and 352.

Namely, referring to FIG. 2, the QR 310 has a rod shape that has a major axis and a minor axis. The QR 310 is arranged such that the major axis of the QR 310 is parallel to the direction of the electric field between the pixel and common electrodes 350 and 352. In other words, the major axis of the QR 310 is arranged along a direction being perpendicular to an extension direction of the pixel and common electrodes 350 and 352.

For example, the QR composition, which includes the QR 310, the polymer 320, and the solvent (not shown), are coated over the first substrate 330 including the pixel and common electrodes 350 and 352. In this instance, the QRs 310 are randomly dispersed in the solvent. When the voltages are applied into the pixel electrode 350 and the common electrode 352, the QRs 310 are arranged such that the major axis of the QRs 310 is parallel to the direction of the electric field between the pixel and common electrodes 350 and 352. In this step, the QR composition is cured to form the QR film 370. As a result, in the QR film 370, the major axis of the QRs 310 is parallel to the direction of the electric field between the pixel and common electrodes 350 and 352.

As mentioned above, since an induced dipole is generated in the dipole side chain 324 of the polymer 320, the axis of the dipole side chains 324 are arranged along the direction of the electric field between the pixel and common electrodes 350 and 352. Namely, the polymer 320 serves as a guide for arrangement of the QRs 310. As a result, the arrangement degree of the QRs 310 is improved.

In the related art LCD device, an alignment layer should be formed, and the aligning process should be performed. On the other hand, in the related art QR display device, where the QR film is formed by a solution process, the arrangement degree of the QRs is decreased. However, in the display device including the QR film 370 of the present invention, the processes of forming the alignment layer and aligning the alignment layer are not required, and the QR film 370 having the improved QR arrangement degree is formed by a solution process.

In addition, since the QRs 310 can emit red, green, and blue lights, a color filter, which is required in the LCD device, can be omitted.

In the QR display device 300 of the present invention, a lower surface of the QR film 370 may contact the pixel and common electrodes 350 and 352 without the alignment layer, and an upper surface of the QR film 370 may contact the second substrate 360. When other elements are formed on the pixel and common electrodes 350 and 352, and a bottom side of the second substrate 360, the QR film 370 may contact these elements.

On the other hand, when the pixel electrode 350 and the common electrode 352 are configured to have a fringe field switching mode structure, the QR film 370 may contact one of the pixel and common electrodes 350 and 352.

In addition, when the pixel electrode 350 and the common electrode 352 are configured to have the fringe field switching mode structure, the length direction, i.e., the major axis, of the QRs 310 are arranged to be parallel to an extension direction, i.e., a major axis, of the opening in one of the pixel electrodes 350 and the common electrodes 352.

As mentioned above, the QR 310 is arranged along the direction of the electric field between the pixel and common electrodes 350 and 352, and the arrangement degree may depend on an aspect ratio of the QR 310. Namely, as the aspect ratio of the QR 310 is increased, the arrangement degree is increased. However, when the aspect ratio of the QR 310 is increased, the quantum efficiency of the QR 310 is decreased. Namely, the arrangement degree and the quantum efficiency by the aspect ratio have a trade-off.

In addition, in the related art QR film, since the arrangement degree of the QR 310 is further decreased by the polymer in a solution process, the aspect ratio of the QRs should be further increased to have high QR arrangement degree. In this instance, the quantum efficiency of the QR is further decreased.

However, in the present invention, since the QR film 370 includes the polymer 320 including the dipole side chain 324, the arrangement degree of the QRs 310 is improved. Namely, the dipole side chain 324 of the polymer 320 serves as a guide for the QRs 310. Accordingly, without decrease of the quantum efficiency, the QR arrangement degree is increased, and the driving property and the polarization property of the QR display device 300 are improved.

In other words, in the display device using the QRs, the display device provides an Off state by separating the hole and electron by the electric field between the pixel and common electrode. The Off property of the display device depends on the QR arrangement degree. Accordingly, with low QR arrangement degree, the driving voltage is increased.

However, in the QR display device 300 of the present invention, since the QR arrangement degree is increased by the dipole side chain 324 of the polymer 320, the driving voltage of the QR display device 300 is reduced without decrease of the quantum efficiency of the QR 310. In addition, due to the increase of the QR arrangement degree, the polarization property of the light emitted from the QR film 370 is increased.

Moreover, since the polarized light is emitted from the QR film 370 in the QR display device 300, the polarization plate, which is required in the LCD device, can be omitted. Furthermore, since the red, green, and blue lights are emitted from the QRs 310, the color filter, which is required in the LCD device, can be omitted. Accordingly, the QR display device 300 of the present invention has advantages in production costs, weight, and thickness.

In FIG. 7, the QR film 370 is disposed between two substrates 330 and 360 of the display device 300. The QR film 370 is used for various semiconductor devices. Since the QR film 370 has the polarization property, the QR film 370 may be used instead of a polarization plate of a display device.

FIGS. 8A to 8E are schematic cross-sectional views illustrating a fabricating process of a QR film according to the third embodiment of the present invention.

Figure 8A:
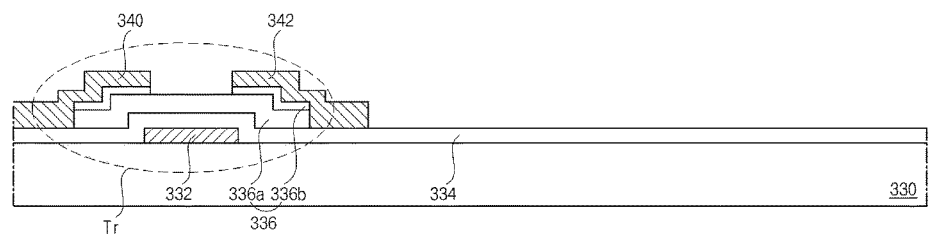
FIGS. 8A to 8E are schematic cross-sectional views illustrating a fabricating process of a QR film according to the third embodiment of the present invention.

As shown in FIG. 8A, a first metal layer (not shown) is formed on the first substrate 330 and is patterned to form the gate electrode 332. The gate line (not shown), which extends from the gate electrode 332, along a direction is also formed on the substrate 330. In addition, the common line (not shown), which may be parallel to the gate line, is formed on the substrate 330.

Next, an inorganic material, such as silicon oxide or silicon nitride, is deposited to form the gate insulating layer 334 on the gate electrode 332, the gate line, and the common line.

Next, an intrinsic amorphous silicon layer (not shown) and an impurity-doped amorphous silicon layer (not shown) are sequentially formed on the gate insulating layer 334 and are patterned to form the semiconductor layer 336, which includes the active layer 336a and the ohmic contact layer 336b, in correspondence to the gate electrode 332.

Next, a second metal layer (not shown) is formed and patterned to form the source electrode 340 and the drain electrode 342. The source and drain electrodes 340 and 342 are disposed on the semiconductor layer 336 and spaced apart from each other. In addition, the data line (not shown), which crosses the gate line to define a pixel region and extends from the source electrode 340, is formed.

The gate electrode 332, the gate insulating layer 334, the semiconductor layer 336, the source electrode 340, and the drain electrode 342 constitute the TFT Tr.

Figure 8B:
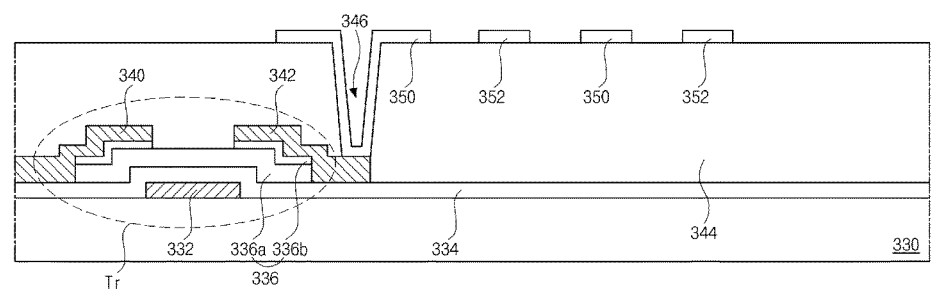

Next, as shown in FIG. 8B, the passivation layer 344 covering the TFT Tr is formed and is patterned to form the drain contact hole 346. In addition, the passivation layer 344 and the gate insulating layer 334 are patterned to form the common contact hole (not shown) exposing a portion of the common line.

Next, a transparent conductive material layer (not shown) is formed on the passivation layer 344 by depositing a transparent conductive material such as indium-tin-oxide (ITO) or indium-zinc-oxide (IZO). The transparent conductive material layer is patterned to form the pixel electrode 350 and the common electrode 352.

The pixel electrode 350 is connected to the drain electrode 342 through the drain contact hole 346, and the common electrode 352 is connected to the common line through the common contact hole. The pixel and common electrodes 350 and 352 are alternately arranged.

Figure 8C:
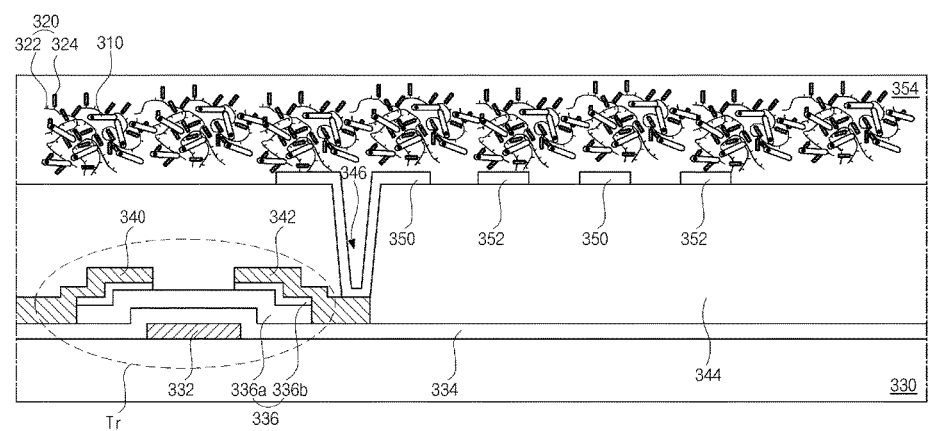

Next, as shown in FIG. 8C, the QR composition, which includes the QR 310, the polymer 320, and the solvent (not shown), is coated over the substrate 330 including the pixel and common electrodes 350 and 352 such that a QR solution layer 354 is formed. For example, the QR composition may be coated by an ink jet process.

The polymer 320 may include the main chain 322 of polyoxetane, polysiloxane, or polyester and the dipole side chain 324 for generating the induced dipole. The solvent may include at least one of tetraline and diethylbenzene. In the QR solution layer 354, the QRs 310 are randomly arranged.

Figure 8D:
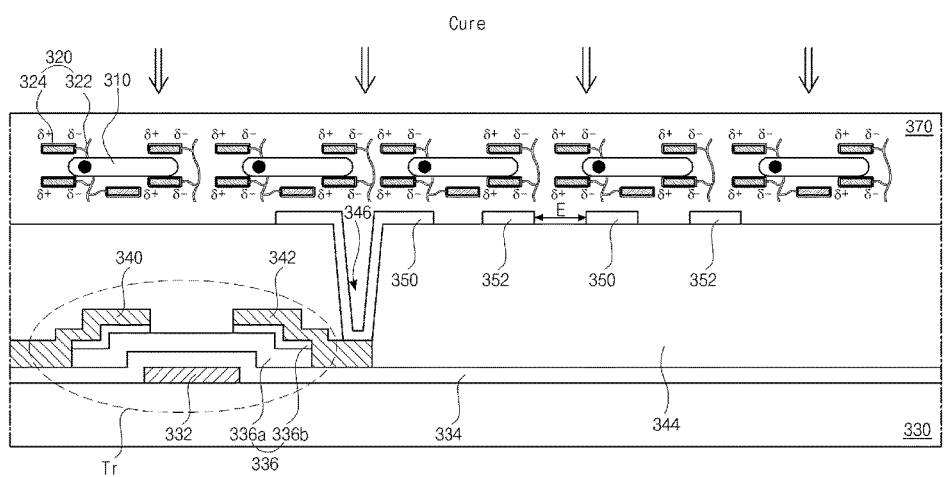

Next, as shown in FIG. 8D, with generating an electric field between the pixel and common electrodes 350 and 352, the QR solution layer 354 (of FIG. 8C) is cured to form the QR film 370. When the electric field is generated between the pixel and common electrodes 350 and 352, the QRs 310 and the axis of the dipole side chains 324 of the polymer 320 are arranged along the direction of the electric field. In addition, after the curing process for forming the QR film 370, the QRs 310 and the dipole side chains 324 maintain their arrangement without the electric field. The curing process may be performed by heat generated in a step of forming the electric field. Alternatively, an additional curing step including UV irradiation or heating may be performed to the QR solution layer 354 including a UV curing agent or a thermal curing agent.

Namely, in the present invention, without a process of forming an alignment layer and a process of aligning or rubbing the alignment layer, the QRs 310 can be aligned or arranged to be parallel to the electric field. Since the QR solution layer 354 is cured with the electric field, the curing process for forming the QR film 370 and the aligning process of the QRs 310 are performed in one process. Accordingly, a fabricating process is simplified.

As mentioned above, since the arrangement degree of the QR 310 is increased by the dipole side chain 324 of the polymer 320 being capable of generating the induced dipole, the QR film 370 has advantages in the driving voltage and the polarization property without loss of quantum efficiency.

Figure 8E:
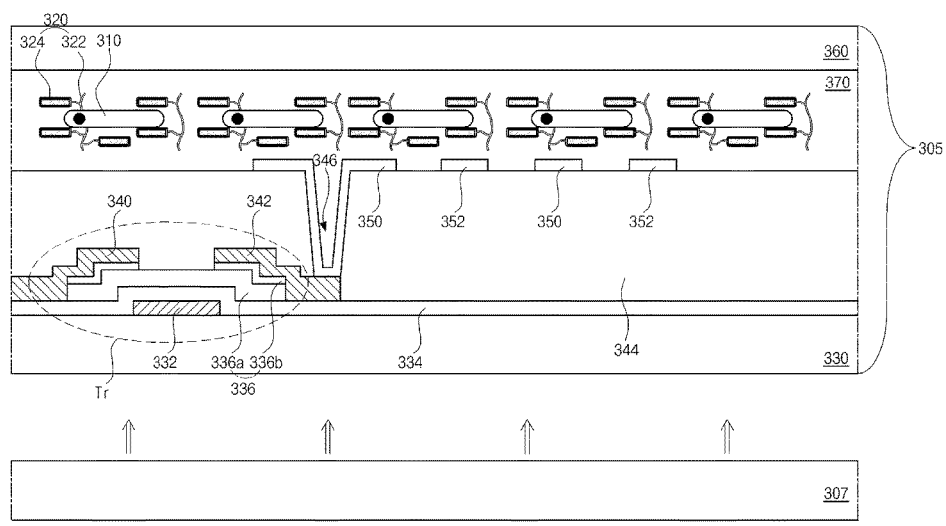

Next, as shown in FIG. 8E, the second substrate 360 is disposed over the QR film 370, and the first and second substrates 330 and 360 are attached. As a result, the display panel 305 is fabricated. The backlight unit 307 including the UV light source is disposed under the display panel 305 such that the display device 300 of the present invention is provided.

Fourth Embodiment

Figure 9:
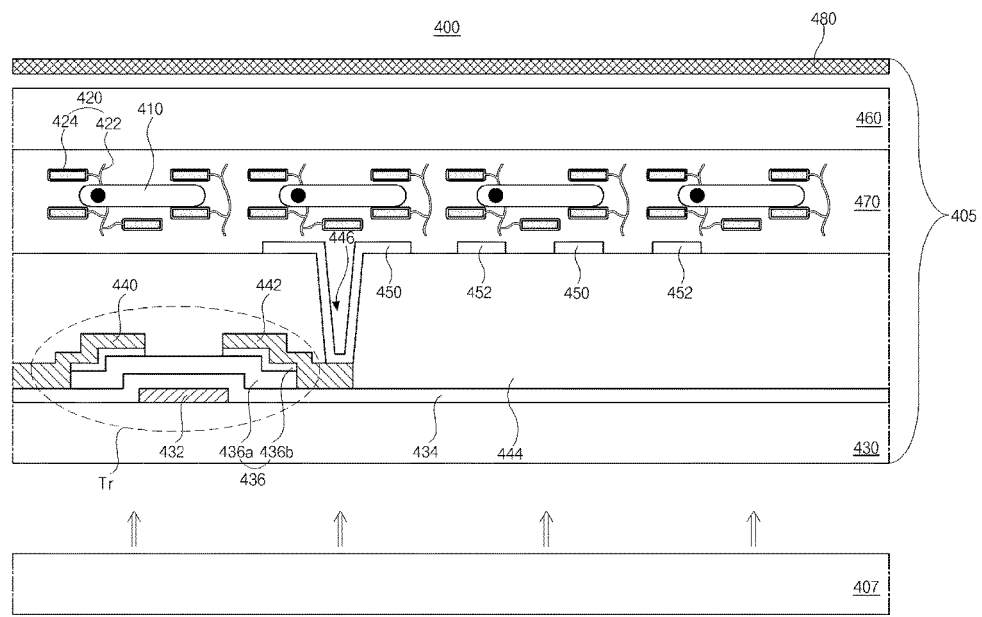
FIG. 9 is a schematic cross-sectional view of a display device including a QR film according to the third embodiment of the present invention.

FIG. 9 is a schematic cross-sectional view of a display device including a QR layer according to a fourth embodiment of the present invention.

As shown in FIG. 9, a QR display device 400 of the present invention includes a display panel 405, which includes pixel and common electrodes 450 and 452 for generating an electric field, a QR film 470, and a polarization plate 480, and a backlight unit 407 including a UV light source (not shown).

The display panel 405 includes a first substrate 430, which is adjacent to the backlight unit 407, the pixel and common electrodes 450 and 452, which is positioned over the first substrate 430, a second substrate 460, which faces the first substrate 430, the QR film 470, which is positioned between the first and second substrates 430 and 460, and the polarization plate 480 at an outer side of the second substrate 460. The QR film 470 includes the QR 410 and the polymer 420.

The pixel electrode 450 and the common electrode 452 are positioned between the first substrate 430 and the QR film 470 and generate a horizontal electric field for driving the QR 410 of the QR film 470. As mentioned above, each common electrode 352 may be positioned in between two pixel electrodes 350, so that a horizontal electric field is generated between each pair of adjacent pixel and common electrodes 350 and 352.

Alternatively, as mentioned above, one of the pixel and common electrodes 450 and 452 may have a plate shape, and the other one of the pixel and common electrodes 450 and 452 may include at least one opening. In this instance, the pixel and common electrodes 450 and 452 are positioned in different layers and overlap each other in a pixel region. Namely, the display panel 405 may have a fringe field switching (FFS) mode electrode structure.

A thin film transistor (TFT) Tr as a switching element is formed on the first substrate 430, and the pixel electrode 450 may be connected to the TFT Tr.

The QR film 470 is positioned between the first and second substrates 430 and 460 and includes the QR 410 and the polymer 420. The polymer 420 includes the main chain 422 and the dipole side chain 424. The QR 410 and the dipole side chain 424 may be arranged in a direction being substantially parallel to the horizontal electric field between the pixel and common electrodes 450 and 452.

Namely, referring to FIG. 2, the QR 410 has a rod shape that has a major axis and a minor axis. The QR 410 is arranged such that the major axis of the QR 410 is parallel to the direction of the electric field between the pixel and common electrodes 450 and 452. In other words, the major axis of the QR 410 is arranged along a direction being perpendicular to an extension direction of the pixel and common electrodes 450 and 452.

For example, the QR composition, which includes the QR 410, the polymer 420, and the solvent (not shown), are coated over the first substrate 430 including the pixel and common electrodes 450 and 452. In this instance, the QRs 410 are randomly dispersed in the solvent. When the voltages are applied to the pixel electrode 450 and the common electrode 452, the QRs 410 are arranged such that the major axis of the QRs 410 is parallel to the direction of the electric field between the pixel and common electrodes 450 and 452. In this step, the QR composition is cured to form the QR film 470. As a result, in the QR film 470, the major axis of the QRs 410 is parallel to the direction of the electric field between the pixel and common electrodes 450 and 452.

As mentioned above, since an induced dipole is generated in the dipole side chain 424 of the polymer 420, the axis of the dipole side chains 424 are arranged along the direction of the electric field between the pixel and common electrodes 450 and 452. Namely, the polymer 420 serves as a guide for arrangement of the QRs 410. As a result, the arrangement degree of the QRs 410 is improved.

In the display device including the QR film 470 of the present invention, the processes of forming the alignment layer and aligning the alignment layer are not required, and the QR film 470 having the improved QR arrangement degree is formed by a solution process. In addition, since the QRs 410 can emit red, green, and blue lights, a color filter, which is required in the LCD device, can be omitted.

In the QR display device 400 of the present invention, a lower surface of the QR film 470 may contact the pixel and common electrodes 450 and 452 without the alignment layer, and an upper surface of the QR film 470 may contact the second substrate 460. When the other elements are formed on the pixel and common electrodes 450 and 452 and a bottom side of the second substrate 460, the QR film 470 may contact these elements.

On the other hand, when the pixel electrode 450 and the common electrode 452 are configured to have a fringe field switching mode structure, the QR film 470 may contact one of the pixel and common electrodes 450 and 452.

In addition, when the pixel electrode 450 and the common electrode 452 are configured to have the fringe field switching mode structure, the length direction, i.e., the major axis, of the QRs 410 are arranged to be parallel to an extension direction, i.e., a major axis, of the opening in one of the pixel electrode 450 and the common electrode 452.

The polarization plate 480 of the QR display device 400 is disposed at the outer side of the second substrate 460 and has an optical transmissive axis being parallel to a horizontal length direction, i.e., a major axis direction, of the QR 410. As a result, the polarization plate 480 transmits the linearly-polarized light emitted from the QR 410 such that images are displayed.

In addition, since the polarization plate 480 is disposed at an outer position of the QR display device 400, an ambient light reflection is prevented or minimized. Accordingly, the decrease of the visibility by the ambient light reflection is prevented.

Figure 10:
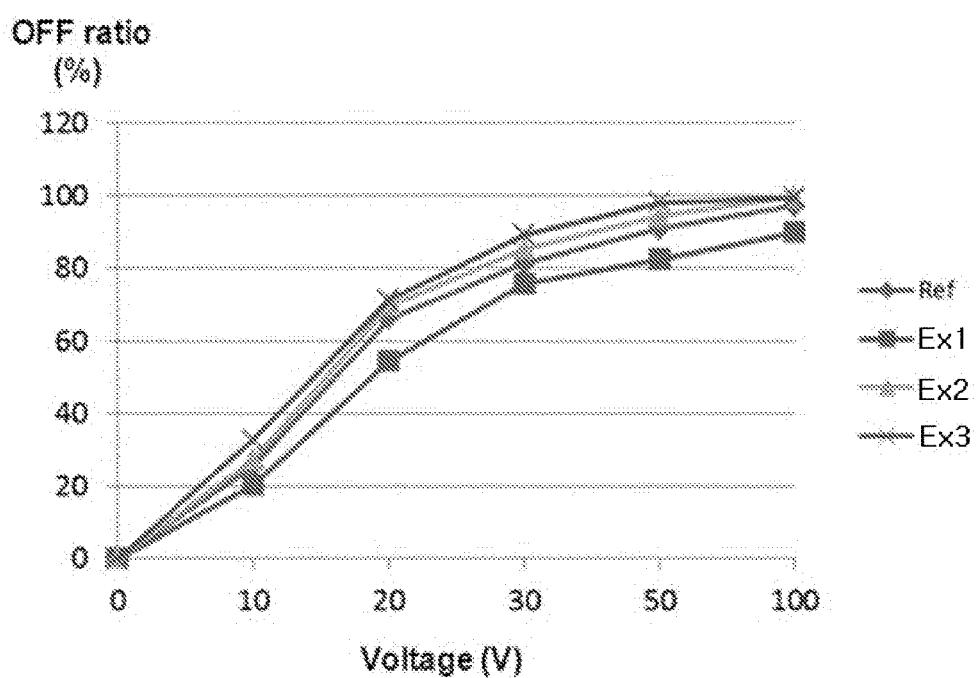
FIG. 10 is a graph showing an On/Off property in a display device including the QR film.
Figure 11:
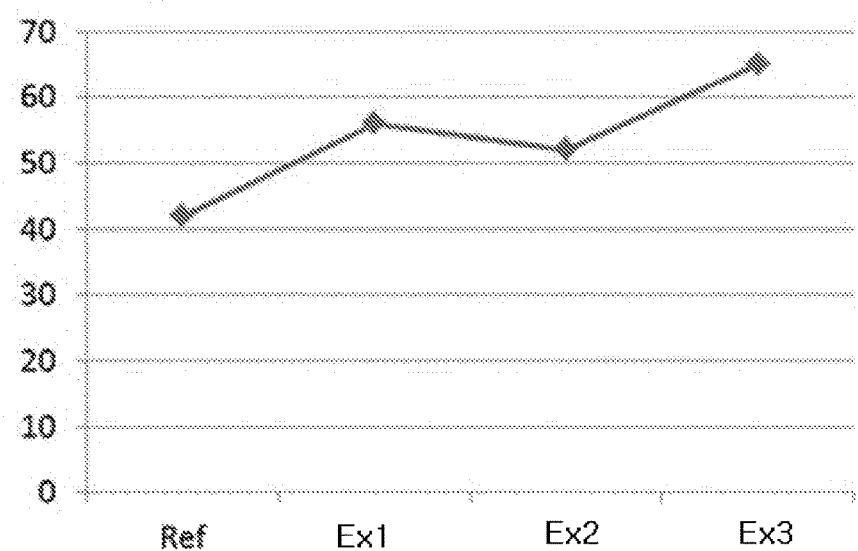
FIG. 11 is a graph showing a polarization property in a display device including the QR film.

FIG. 10 is a graph showing an On/Off property in a display device including the QR film, and FIG. 11 is a graph showing a polarization property in a display device including the QR film. ("OFF ratio (%)" is a ratio of a brightness in On state with voltages to a brightness in OFF state without voltages)

A QR film is formed using QR composition listed in Table 1 (polymer molecular weight: 20,000, solution viscosity: 10 cP), and the driving property and the polarization property are measured. The "Polymer1" is the compound in the Formula 2-1, the "Polymer2" is the compound in the Formula 2-2, and "Polymer3" is the compound in the Formula 2-3.

TABLE 1

|  | Ref | Ex1 | Ex2 | Ex3 |
|---|---|---|---|---|
| Polymer (15 wt %) | Polyester | Polymer1 | Polymer2 | Polymer3 |
| QR (3 wt %) | CdSe/CdS | CdSe/CdS | CdSe/CdS | CdSe/CdS |
| Solvent (82 wt %) | Tetralin | Tetralin | Tetralin | Tetralin |

As shown in Table 1 and FIGS. 10 and 11, in the QR film including the polymer having the dipole side chain, the driving property and the polarization property are improved.

Namely, as mentioned above, when the QR film is formed by the QR composition including the polymer having the dipole side chain, there are advantages in the driving voltage and the polarization property without loss of the quantum efficiency.

In the present invention, since the QR composition includes the polymer having the polymer having the dipole side chain, the QR film can be formed by the solution process and the problem of increase of the driving voltage or decrease of the polarization property are prevented or minimized.

In addition, in the display panel including the QR film, since the arrangement degree of the QRs is increased without the alignment layer, the fabricating process of the display device is simplified.

Moreover, since the QR display device does not require the polarization plate and the color filter layer, the thickness of the display device and the production cost are reduced.

It will be apparent to those skilled in the art that various modifications and variations can be made in the embodiments of the invention without departing from the spirit or scope of the invention. Thus, it is intended that the modifications and variations cover this invention provided they come within the scope of the appended claims and their equivalents.

What is claimed is:

1. A quantum rod composition, comprising:
a plurality of quantum rods;
a polymer comprising:
   a main chain; and
   a plurality of side chains attached to the main chain; and
a solvent,
wherein the plurality of side chains are configured to generate an induced dipole, and wherein the plurality of side chains comprises at least one selected from the group consisting of:

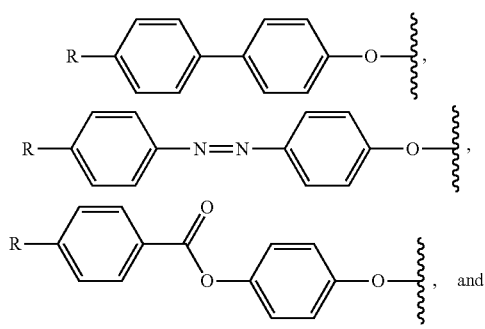

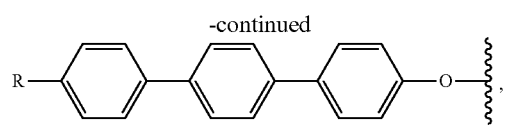

wherein R is selected from the group consisting of F, CF$_3$, and CN.

2. The quantum rod composition of claim 1, wherein responsive to an external electric field, a major axis of the plurality of quantum rods and an axis of the plurality of side chains are arranged along a direction substantially parallel to the external electric field.

3. The quantum rod composition of claim 1, wherein the main chain of the polymer is selected from polyoxetane, polysiloxane, or polyester.

4. The quantum rod composition of claim 1, wherein each of the plurality of quantum rods comprises a core, or a core and a shell surrounding the core, the core having a sphere shape, an elliptical sphere shape, a polyhedral shape, or a rod shape, and the shell having a rod shape.

5. The quantum rod composition of claim 4, wherein the core is formed from one or more of CdSe, CdTe, ZnO, ZnSe, ZnS, ZnTe, HgSe, and CdZnSe.

6. A quantum rod film, comprising:
a plurality of quantum rods; and
a polymer comprising:
   a main chain; and
   a plurality of side chains attached to the main chain,
wherein a major axis of the plurality of quantum rods and an axis of the plurality of side chains are arranged along a same direction, and
wherein the plurality of side chains are configured to generate an induced dipole, wherein the plurality of side chains comprises at least one selected from the group consisting of:

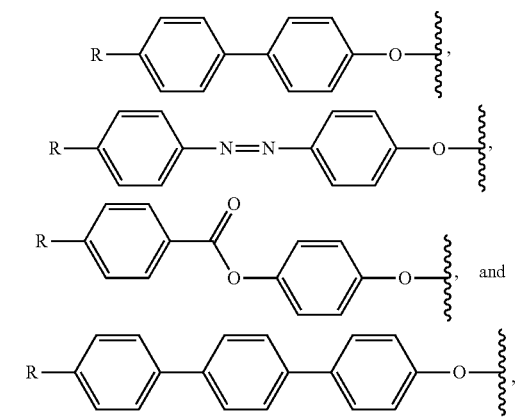

wherein R is selected from the group consisting of F, CF$_3$, and CN.

7. The quantum rod film of claim 1, wherein the main chain of the polymer is selected from polyoxetane, polysiloxane, or polyester.

8. The quantum rod film of claim 6, wherein each of the plurality of quantum rods comprises a core, or a core and a shell surrounding the core, the core having a sphere shape, an elliptical sphere shape, a polyhedral shape, or a rod shape, and the shell having a rod shape.

9. The quantum rod film of claim 8, wherein the core is formed from one or more of CdSe, CdTe, ZnO, ZnSe, ZnS, ZnTe, HgSe, and CdZnSe.

* * * * *